United States Patent
Unsin et al.

(10) Patent No.: US 9,816,576 B2
(45) Date of Patent: Nov. 14, 2017

(54) COMPACT CONTROL DEVICE FOR FAILSAFELY CONTROLLING AN ELECTRICAL ACTUATOR

(71) Applicant: Chr. Mayr GmbH & Co. KG, Mauerstetten (DE)

(72) Inventors: Karl Unsin, Beckstetten (DE); Martin Hecht, Kaufbeuren (DE); Alexander Wiegert, Ostfildern (DE); Andreas Hahn, Ostfildern (DE); Berthold Roessler, Ostfildern (DE); Michael Haerter, Ostfildern (DE)

(73) Assignee: CHR. MAYR GMBH & CO. KG, Mauerstetten (DE)

( * ) Notice: Subject to any disclaimer, the term of this patent is extended or adjusted under 35 U.S.C. 154(b) by 115 days.

(21) Appl. No.: 14/531,387

(22) Filed: Nov. 3, 2014

(65) Prior Publication Data
US 2015/0053514 A1     Feb. 26, 2015

Related U.S. Application Data

(63) Continuation of application No. PCT/EP2012/072823, filed on Nov. 16, 2012.

(30) Foreign Application Priority Data

May 4, 2012   (DE) .................... 20 2012 101 654 U (51) Int. Cl.
*F16D 65/14*     (2006.01)
*B66D 5/14*      (2006.01)
(Continued)

(52) U.S. Cl.
CPC .............. *F16D 65/14* (2013.01); *B66D 5/14* (2013.01); *B66D 5/30* (2013.01); *F16D 2121/22* (2013.01)

(58) Field of Classification Search
CPC ...................................................... F16D 65/14
(Continued)

(56) References Cited

U.S. PATENT DOCUMENTS 6,051,894 A  *  4/2000  Shimogama  .........  H01H 47/002
                                                     307/125
6,871,127 B2 *  3/2005  Dominke  .............  B62D 5/0493
                                                     180/422

(Continued)

FOREIGN PATENT DOCUMENTS

DE         10325363 A1    1/2005
DE     102005048208 A1    4/2007
(Continued)

OTHER PUBLICATIONS

Chinese Search Report for Appl'n No. 2012800745047; dated Feb. 4, 2016; 2 pp.
(Continued)

*Primary Examiner* — David S Luo
(74) *Attorney, Agent, or Firm* — Harness, Dickey & Pierce, P.L.C.

(57) ABSTRACT

A compact control device for failsafely controlling an electrical actuator capable of moving a movable machine part into a defined end position, has an input connection for receiving an external control signal representing a desired position of the machine part. The compact control device further has an input part for detecting a position signal, which signals an actual position of the machine part at the defined end position. A power section comprises a power switching element for switching on and failsafely switching off a control current for the actuator that is supplied to the electrical actuator via a first output connection. The compact control device has a second output connection for providing an external status signal and an evaluation unit which actuates the power switching element depending on the
(Continued)

external control signal and generates the external status signal at the second output connection depending on the position signal.

14 Claims, 3 Drawing Sheets

(51) Int. Cl.
  *B66D 5/30* (2006.01)
  *F16D 121/22* (2012.01)
(58) Field of Classification Search
  USPC .................................................. 361/142, 23
  See application file for complete search history.

(56) References Cited

U.S. PATENT DOCUMENTS

| | | | |
|---|---|---|---|
| 7,573,693 B2 | 8/2009 | Hornung | |
| 7,775,072 B2 * | 8/2010 | Pullmann | E05B 15/101 292/144 |
| 7,933,104 B2 * | 4/2011 | Bauer | G05B 9/02 361/93.1 |
| 2002/0130557 A1 | 9/2002 | Dickhoff | |
| 2003/0011250 A1 | 1/2003 | Pullmann et al. | |
| 2011/0240411 A1 | 10/2011 | Rui | |

FOREIGN PATENT DOCUMENTS

| | | |
|---|---|---|
| DE | 202011005655 | 1/2012 |
| WO | WO-2005101439 A1 | 10/2005 |

OTHER PUBLICATIONS

International Search Report dated Apr. 17, 2013; 11 pp.
EN ISO 13849-1; Safety of machinery—Safety-related parts of control systems—Part 1: General principles for design; Nov. 2006; 97 pp.
CEI IEC 61508-2; Functional safety of electrical/electronic/programmable electronic safety-related systems—Part 2: Requirements for electrical/electronic/programmable electronic safety-related systems; May 2000; 152 pp.
ISA/EP; English language translation of International Preliminary Report on Patentability (Chapter 1); issued by WIPO dated Nov. 4, 2014; 8 pp.

\* cited by examiner

COMPACT CONTROL DEVICE FOR FAILSAFELY CONTROLLING AN ELECTRICAL ACTUATOR

CROSS-REFERENCES TO RELATED APPLICATIONS

This application is a continuation of international patent application PCT/EP2012/072823 filed on Nov. 16, 2012 designating the U.S., which international patent application has been published in German language and claims priority from German patent application DE 20 2012 101 654.0 filed on May 4, 2012. The entire contents of these priority applications are incorporated herein by reference.

BACKGROUND OF THE INVENTION

The present invention relates to a compact control device for failsafely controlling an electrical actuator, in particular for controlling a safety brake as is used, for example, in elevators and other movement axis affected by gravity. Furthermore, the invention relates to an apparatus for the failsafe holding of weights, such as an elevator or the like, comprising a mechanical brake and a compact control device.

It is known to use safety brakes in order to safeguard elevators and other vertically raised weights against uncontrolled falling. DE 10 2005 048 208 A1, for example, describes such a safety brake for elevators. The safety brake has a rotor, which is connected to a shaft to be braked in rotationally fixed fashion, and one or more armature plates, which secure the rotor via a friction lining. The armature plates are biased via springs such that they prevent a rotary movement of the rotor in the rest state. In order to release the brake, an electromagnet needs to be excited with a control current in such a way that the armature plates are pulled away as a result of the magnetic force of the rotor. As soon as the current is interrupted, the armature plates press against the rotor again as a result of the spring force, with the result that the weight is safely stopped in the event of a power failure.

Switching-on and especially switching-off the current by the electromagnet is a safety-critical task since an undesired current flow, for example as a result of a fault in the electrical control system, can cause undesired opening of the brake and therefore falling of the weight. It is therefore common practice to control the electromagnet using a failsafe PLC in accordance with relevant standards for machine safety. A suitable safety controller generally needs to meet the requirements according to SIL 3 of the European Standard EN IEC 61508 and/or in accordance with PL e of the standard EN ISO 13849. Such a safety PLC ensures, by virtue of redundancy, regular internal function tests and/or further measures, that a control output does not cause an undesired current flow even when a fault, for example a short circuit, occurs in the safety PLC and/or in the connecting lines to the brake.

Furthermore, it is known to monitor the state of the safety brake. For example, the safety brake known from DE 10 2005 048 208 A1 has a microswitch, which signals the so-called application and release of the brake, i.e. the release of the armature plates from the rotor with the aid of the electromagnet. However, the outputs of conventional safety PCs are not designed to provide the high control current required for releasing an elevator brake. In practice, the control current is therefore switched on and off by means of contactors, wherein the contactors are actuated via the outputs of a safety PLC. This necessitates that the safety PLC monitors the functioning of the switching contactors in order to eliminate the possibility of an undesired current flow through the electromagnet of the safety brake. Furthermore, the safety PLC can monitor the state of the brake by means of the microswitch. All of the control and monitoring functions need to be programmed in the safety PLC and validated by the constructor of the installation.

DE 103 25 363 A1 describes a safety switching device for the failsafe disconnection of an inductive load, for example in the form of contactors or solenoid valves. During disconnection of the current through such load, an overvoltage, which is often limited by means of a suppressor diode, is generated as a result of mutual induction. However, the time required for the disconnection is longer the more the overvoltage is limited. The safety switching device of DE 103 25 363 A1 therefore has an anti-surge element, which has a first and at least one second anti-surge operating mode, which can be activated optionally with respect to one another, wherein the limitation of the overvoltage is different in the two anti-surge operating modes. Therefore, this safety switching device can optionally effect quicker, abrupt disconnection at a high induced voltage or slower, soft disconnection at a low induced voltage.

SUMMARY OF THE INVENTION

There is a desire to simplify the control of a safety brake whilst adhering to the stringent safety requirements. Accordingly, it is an object of the present invention to provide an alternative which enables simple and nevertheless failsafe control of a safety brake or a similar actuator.

In accordance with a first aspect of the invention, there is provided a compact control device for failsafely controlling an electrical actuator which is capable of moving a movable machine part into a defined end position, the compact control device comprising a device housing, comprising a first input connection arranged on the device housing for receiving a first external control signal which represents a desired position of the machine part, comprising an input part arranged in the device housing for detecting a position signal which signals an actual position of the machine part at the defined end position, comprising a power section arranged in the device housing and having at least one power switching element designed to switch on and failsafely switch off a control current for the actuator, comprising a first output connection arranged on the device housing for supplying the control current to the electrical actuator, comprising a second output connection arranged on the device housing for providing an external status signal, and comprising an evaluation unit arranged in the device housing and designed to actuate the at least one power switching element depending on the first external control signal and to generate the external status signal at the second output connection depending on the position signal.

In accordance with a further aspect, there is provided an apparatus for the failsafe holding of weights, comprising a mechanical brake which has a rotor and an armature plate, wherein the armature plate is biased against the rotor via at least one spring in order to secure said rotor against movement, comprising an electromagnet, designed to move the armature plate counter to the spring into a release position, and comprising a compact control device comprising a first input connection for receiving a first external control signal which represents a desired position of the machine part, an input part for detecting a position signal which signals an actual position of the machine part at the defined end position, a power section having at least one power switching element designed to switch on and failsafely switch off a control current for the actuator, a first output connection for supplying the control current to the electrical actuator, a second output connection for providing an external status signal, and an evaluation unit designed to actuate the at least one power switching element depending on the first external control signal and to generate the external status signal at the second output connection depending on the position signal, wherein the electromagnet is connected to the first output connection of the compact control device, and wherein the position signal signals the release position of the armature plate as the defined end position.

The novel compact control device, by virtue of the at least one power switching element, is designed to replace the contactors which have been required to date for actuating a safety brake or a comparable actuator. In particular, the at least one power switching element is capable of switching a control current of more than 2 A in the preferred exemplary embodiments, and in particular a control current of more than 4 A or even more than 5 A.

However, the novel compact control device does not simply replace the contactors required to date, i.e. it does not only effect the switching operation which is required for switching on and off the control current. Instead, the compact control device furthermore has the capability of monitoring the defined end position of the movable machine part, preferably in a failsafe manner. In particular, it takes on the task of monitoring the application and/or release of an electrically actuated safety brake. Therefore, the novel compact control device combines the pure power switching function of the contactors used to date with (sub)functions which previously needed to be programmed in a safety PLC. In other words, the novel compact control device is a type of intelligent switching actuator, which forms a novel linking element between an operational control system for an elevator or the like and a position actuator, wherein the latter serves the purpose of bringing a movable machine part into a defined end position.

The novel compact control device is neither intended nor designed to entirely take on the function of the safety PLC. Therefore, the novel compact control device provides an external status signal for a superordinate control system at the second output connection. The external status signal represents the position of the actuated machine part, i.e., for example, the position of the armature disk of an electrically actuated safety brake, as a result of preprocessing by the evaluation unit integrated in the compact control device. The superordinate control system can process the external status signal as logic and preferably binary information representing the actual state of the safety brake without the control system needing to evaluate all of the detailed information which is of importance to the state of the actuator.

The novel compact control device therefore combines the essential safety-relevant functions at the electrical interface between an operational control system for a weight carrying installation and a controlled position actuator. It firstly provides the high control current required for actuating the actuator. In the process, the compact control device responds to a first external control signal, which represents the desired position of the machine part. In other words, the compact control device ensures that the "logic" control command of the superordinate control system is executed by means of the high control current. Secondly, the compact control device provides a status signal to the superordinate control system, with which status signal the superordinate control system can check the success or lack of success in executing the "logic" control command. In the process, communication between the control system and the compact control device is reduced to the transmission of logic information which represents the desired state and the actual state. The superordinate control system no longer needs to be concerned with details which relate to the actual execution of the control operation.

The novel compact control device therefore simplifies the installation and the commissioning of a safety brake since the signal processing required for monitoring of the safety brake is already implemented in the compact control device and no longer needs to be implemented on a superordinate safety PLC. In particular, the evaluation unit of the novel compact control device ensures failsafe monitoring of the switching operation for interrupting the control current. Furthermore, the wiring of the actuator is simplified since the novel compact control device can disconnect the control current itself in a failsafe manner and is therefore capable of replacing two redundant contactors which have been required for this purpose to date. The above-mentioned object is therefore completely achieved.

Preferably, the novel compact control device has at least three power switching elements, of which two are arranged in parallel with one another. The two parallel power switching elements can be switched on and off by the evaluation unit in parallel with one another and/or separately from one another, and they therefore form two parallel power switching paths which in some variants are switchable separately. A further one of the at least three power switching elements forms a redundant switching element for the parallel power switching paths within the compact control device.

In this refinement, the compact control device is capable of switching on and off two actuators, for example two redundant safety brakes, in parallel with one another. Correspondingly, the compact control device in this refinement is capable of replacing four contactors which have previously been required to release two safety brakes in a failsafe manner. Preferably, at least one third power switching element which is likewise controlled by the evaluation unit is arranged in series with the two parallel power switching elements, which form the parallel switching paths. Therefore, the evaluation unit can interrupt each of the two switching paths in at least two different ways and therefore in a failsafe manner.

In a further refinement, the compact control device has a second input connection for receiving a second external control signal which represents the desired position of the machine part in a redundant manner with the first external control signal.

In this refinement, the evaluation unit of the novel compact control device actuates the at least one power switching element depending on two external control signals. This refinement enables an increased level of failsafety since, for example, cross-circuits and short circuits in the region of the connecting lines between the compact control device and the superordinate control system can be identified in a reliable manner.

In a further refinement, the compact control device has a third input connection for receiving an external third control signal, which represents the desired position of the machine part independently of the first external control signal, wherein the evaluation unit disconnects the control current more slowly depending on the third control signal than depending on the first control signal.

In this refinement, the compact control device has two different inputs for receiving an external control signal, which determines the position of the movable machine part.

Since the evaluation unit disconnects the control current more slowly in response to the third control signal than in response to the first control signal, the two different inputs are suitable for different operating situations. If the armature plate of a safety brake is intended to be brought into contact as quickly as possible with the rotor of the safety brake in an emergency situation, the control current for the electromagnet needs to be disconnected as quickly as possible. In this case, a limitation of the induced voltage occurring during disconnection of the control current is disadvantageous. If however the closing of the brake is not intended to be performed in an emergency situation, but, for example, for securing an elevator which has already come to a standstill or for slowly stopping scenery in a theater, it is advantageous to limit the induced voltage occurring during disconnection of the control current and therefore to allow the control current to decay more slowly. The novel compact control device in this refinement has two inputs, via which a superordinate control system can optionally initiate emergency disconnection or softer disconnection. The novel compact control device therefore enables flexible actuation, wherein the selection of the desired "braking type" is possible purely on the basis of the input used for supplying the external control signal. This enables an inexpensive implementation with a high level of failsafety.

In principle, it is possible for the second input connection and the third input connection to be identical, in which case two redundant external control signals at the first and second input connections signal an emergency disconnection, whereas nonredundant control signals at the two input connections initiate a slow disconnection of the control current. Redundant input signals within this sense are in particular those which have signal changes in synchronism with one another, whereas nonredundant signals have signal changes which are independent of one another. In preferred exemplary embodiments, the signal changes are edge changes of a binary voltage signal which is used by the superordinate control system to signal to the compact control device the desired position intended to be assumed by the machine part.

In a further refinement, at least the first external control signal is therefore a binary control signal. Preferably, the second external control signal and/or the third external control signal are also binary control signals.

In this refinement, the compact control device is essentially restricted to switching on or off the control current. Accordingly, the electrical actuator can only bring the movable machine part into the defined end position or not. Any intermediate positions are not envisaged in this refinement. Therefore, the novel compact control device is particularly suitable for the inexpensive application and release of a safety brake, for the opening or closing of a solenoid valve or for the actuation of another actuator which only has one active state and one inactive state.

In a further refinement, the input part has at least one further input connection, via which the position signal can be supplied to the evaluation unit as an external position signal. Preferably, the input part has two further input connections for receiving two external position signals, wherein each of the two external position signals represents an actuator.

This refinement enables a very simple and inexpensive implementation by virtue of the compact control device reading, for example, the microswitch provided in the safety brake described above via the further input connection. The compact control device in this refinement is therefore particularly suitable for controlling actuators in which the defined end position of the movable machine part is already being signaled via an external binary position signal.

In a further refinement, the compact control device has a third output connection, at which the evaluation unit provides a first test signal, which can be fed back to the input part as a binary position signal via an external position switch.

This refinement enables a very convenient and inexpensive implementation since the compact control device of this refinement is capable of monitoring a position switch by reading back a test signal provided by the compact control device itself. Since the evaluation unit knows the test signal, the monitoring of the external position switch can be configured very easily. Special "training" of the compact control device in respect of an externally supplied position signal can be dispensed with.

In a further refinement, during switch-on, the control current has a present current profile which is dependent on the actuator, and the input part compares the present current profile with a defined reference profile in order to determine the position signal.

In this refinement, the compact control device is capable of determining the actual position of the machine part at the defined end position on the basis of the current profile which results when the control current is switched on. As will be explained below in a preferred exemplary embodiment, the control current through the electromagnet of a safety brake has a characteristic profile from which it is possible to identify whether the electromagnet has actually attracted the armature plate counter to the spring force. A comparable situation applies for solenoid valves and other electromagnetically actuated actuators. The compact control device of this refinement is capable of evaluating such a current profile in order to draw a conclusion on the position of the moving machine part. The refinement has the advantage that it is possible to dispense with external wiring for a position sensor. This firstly saves on the corresponding installation complexity and secondly results in an increased degree of failsafety since external wiring always entails the risk of short circuits or cross-circuits with respect to existing voltage potentials. In exemplary embodiments, the defined reference profile can be stored in the form of a mathematical function, in the form of table values, in the form of parameters for a computation operation or in another way as a setpoint characteristic.

In a further refinement, the evaluation unit generates a fault signal at the second output connection when the position signal does not signal an actual position of the machine part at the defined end position within a defined first time span after switch-on of the control current.

In this refinement, the evaluation unit monitors the result which is intended to be achieved when the control current is switched on, namely that the electrical actuator moves the machine part into the defined end position. The compact control device signals the result at the second output connection, preferably by means of a binary fault signal. Therefore, this refinement contributes to relieving a superordinate operational control system from the safety-relevant monitoring of the electrical actuator.

In a further refinement, the at least one power switching element comprises a first power switching element and a second power switching element, which switch the control current redundantly with respect to one another. Preferably, the power switching elements are semiconductor switching elements. Furthermore, it is preferred if the evaluation unit reads back the respective state of the power switching element in a device-internal manner by virtue of the evaluation unit monitoring the voltage and/or the current at the first output connection.

Semiconductor switching elements have the advantage over the contactors which have been used to date that they can switch high control currents in a manner free of wear. Therefore, the novel compact control device achieves a high switching frequency and a high level of switching reliability. The use of power switching elements which are redundant with respect to one another and which open or close the control current path jointly enables the intrinsic failsafety in a very simple manner. In an exemplary embodiment, the compact control device has four power switching elements, wherein in each case two of the four power switching elements switch a control current jointly and with redundancy with respect to one another.

In a further refinement, the first output connection comprises a first positive output connection and a first negative output connection, which together form a redundant two-pole output for connection of the actuator.

In this refinement, the power switching elements which are redundant with respect to one another are arranged upstream and downstream of the controlled actuator. The control current flows from the first positive output connection to the actuator and from the actuator via the first negative output connection back to the compact control device. As an alternative to this, it is possible in other refinements for the actuator to be arranged between an output connection of the compact control device and a ground potential. The preferred refinement provides the advantage of monitoring the control current flowing back from the actuator in the compact control device. Furthermore, isolation between the power circuit in which the relatively high control current is flowing and a logic circuit in which the evaluation unit processes the input-side control signals and provides the external status signals is ensured. The risk of faulty actuation of the actuator owing to incorrect wiring is further reduced.

In a further refinement, the power section generates a control voltage, which causes the control current to the actuator, wherein the evaluation unit decreases the control voltage after a defined time span has elapsed following switch-on of the control current. In the preferred exemplary embodiments, the evaluation unit decreases the control voltage by virtue of said evaluation unit actuating the at least one power switching element in pulsed fashion and correspondingly effecting pulse width modulation of the control voltage.

It has been demonstrated that the control current for opening a safety brake from the closed state needs to be higher than that for holding the brake in the open (released) state. The present refinement makes use of this effect to reduce the control voltage after termination of the opening operation. In preferred exemplary embodiments, the evaluation unit monitors the decrease in the control voltage after a defined time span has elapsed and generates a fault signal when the control voltage does not decrease to a defined lower value once this time span has elapsed. This fault signal is advantageously provided at the second output connection by means of the external status signal. The decrease in the control voltage enables quicker disconnection of the control current and therefore quicker closing of a safety brake in an emergency situation since, at a relatively low voltage, less energy is stored in the electrical actuator. Therefore, this refinement contributes to a quicker response in the event of a fault. Monitoring of the second time span ensures that a fault in the compact control device which could have a disadvantageous effect on the disconnection time of the control current is identified early.

In a further refinement, the evaluation unit monitors the control voltage in respect of a lower limit and in respect of an upper limit, wherein the evaluation unit generates the external status signal depending on the monitored control voltage as well.

Monitoring of the control voltage in respect of a lower limit is advantageous for preventing unplanned and/or unexpected closing of the safety brake or, more generally, unplanned/unexpected falling of the movable machine part back out of the defined end position. In particular when using the novel compact control device in an elevator or another gravity-affected axle, this refinement contributes to safe and friction-free operation. Monitoring of the control voltage in respect of an upper limit ensures that, in an emergency situation, quick disconnection of the control current is possible. The lower the control voltage is, the less energy needs to be decayed when the control current is disconnected.

In a further refinement, the power switching element is designed to switch a control current of more than 2 amperes. In preferred exemplary embodiments, the at least one power switching element is capable of switching a control current of more than 5 amperes.

As has already been indicated further above, this refinement makes it possible to use the novel compact control device instead of a contactor which has been required to date for actuating a safety brake or a similar actuator, wherein the compact control device, in contrast to the contactors used to date, has integrated monitoring and evaluation functions which enable substantially simpler installation and actuation of a safety brake.

It goes without saying that the features mentioned above and those yet to be explained below can be used not only in the respectively cited combination, but also in other combinations or on their own without departing from the scope of the present invention.

BRIEF DESCRIPTION OF THE DRAWINGS

Exemplary embodiments of the invention are illustrated in the drawing and will be explained in more detail in the description below. In the drawing.

DESCRIPTION OF PREFERRED EMBODIMENTS

Figure 1:
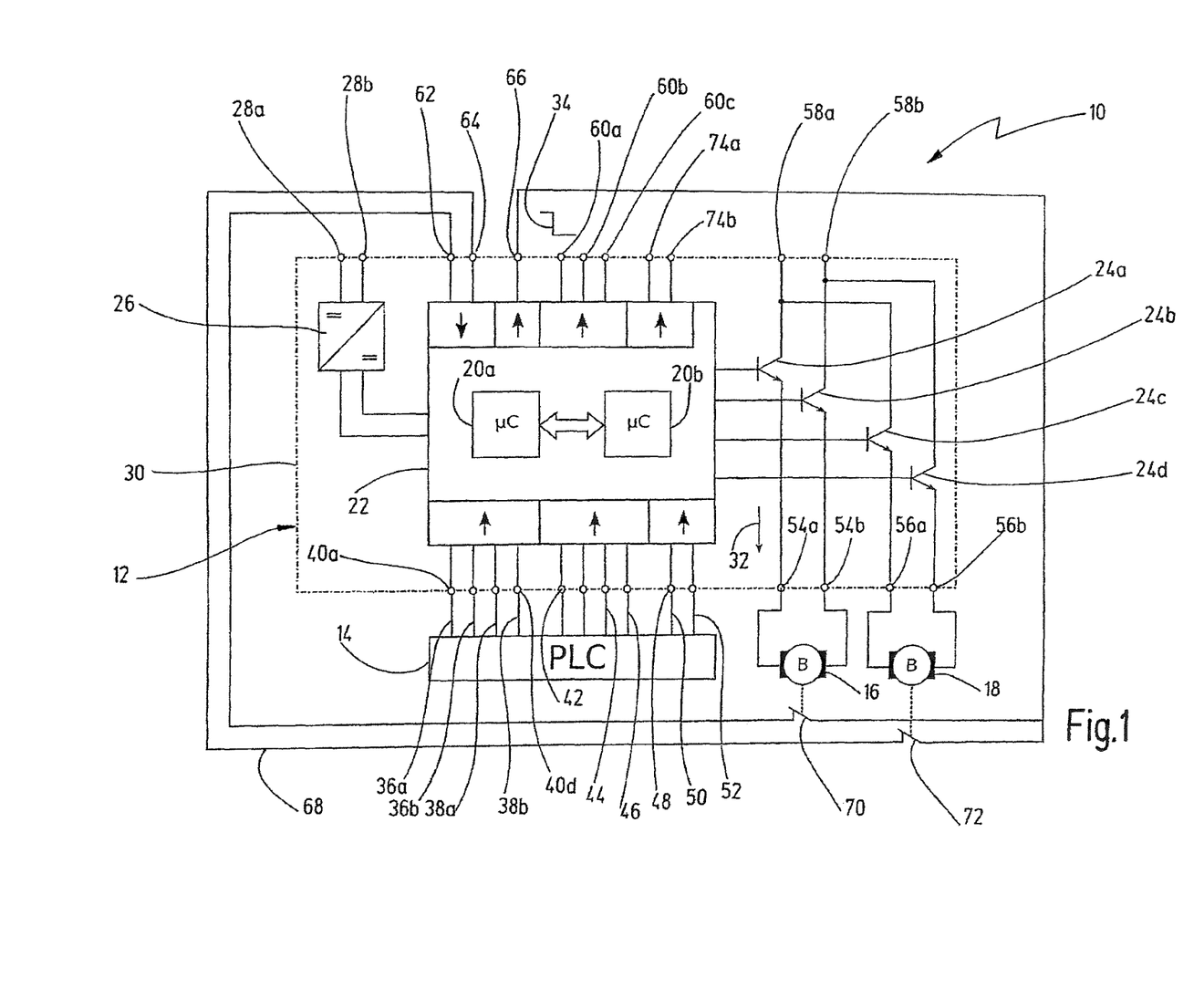
FIG. 1 shows a schematic illustration of an exemplary embodiment of the novel compact control device in a preferred apparatus for the failsafe holding of weights.

In FIG. 1, an apparatus including an exemplary embodiment of the novel compact control device is denoted in its entirety by reference numeral 10. The apparatus 10 comprises a compact control device 12, which is connected to a superordinate control system 14 via a plurality of connecting lines. The compact control device 12 in this case controls two redundant safety brakes 16, 18 depending on control signals which are provided by the superordinate control system. For example, the safety brakes 16, 18 are used in a redundant arrangement to prevent a passenger elevator or another weight from falling. The use of the novel compact control device is not restricted to the control of safety brakes, however. For example, the novel compact control device can, in other exemplary embodiments, be used for actuating solenoid valves and further, preferably inductive, electrical actuators in which a high control current is intended to be switched off in a failsafe manner.

In this exemplary embodiment, the compact control device 12 has two processors 20*a*, 20*b* which are redundant with respect to one another and which process the input signals described below with redundancy and generate the output signals described below depending thereon. The processors 20*a*, 20*b* together form a failsafe evaluation unit 22 by monitoring one another, as illustrated with the aid of a double arrow in FIG. 1. Furthermore, the compact control device 12 in this case has a power section comprising four power switching elements 24*a*, 24*b*, 24*c*, 24*d*. In the preferred exemplary embodiments, the power switching elements 24 are each semiconductor switching elements, for example field-effect transistors, which can switch on and switch off a control current of more than 5 amperes. The respective switching state of the power switching elements 24 is determined and set by means of the evaluation unit 22.

Reference number 26 denotes a switched mode power supply which generates the internal operating voltage required for operating processors 20*a*, 20*b* and for operating the power switching elements 24*a* to 24*d* from an external operating voltage applied to input terminals 28*a*, 28*b* from the outside. In an exemplary embodiment, the external operating voltage applied to the terminals 28*a*, 28*b* is 24 volts, and the switched mode power supply 26 generates internal operating voltages of 3.3 volts and/or 5 volts, for example.

In the preferred exemplary embodiments, the evaluation unit 22 and the power switching elements 24 as well as the switched mode power supply 26 are arranged in a common device housing 30. Accordingly, control device 12 is a compact control device which, in the preferred exemplary embodiments, forms the only connection between the superordinate control system 14 and the safety brakes 16, 18. In these exemplary embodiments, the control system 14 transmits logic control signals to the compact control device 12, wherein the logic control signals represent a desired state for the safety brakes 16. The compact control device 12 firstly generates the power signals, in particular the control current 32, with which the safety brakes 16, 18 are moved from the inactive state to an active state. Secondly, the compact control device 12 generates external status signals, which give feedback to the control system 14 in respect of the actual operating state of the safety brakes 16, 18, in particular a fault signal 34. In the preferred exemplary embodiments, the compact control device 12 is merely a power control device connected upstream of the actuators 16, 18, which power control device performs and monitors the specific actuation of the actuators 16, 18 in a failsafe manner. The operational control of the installation, including the decision as to when the safety brakes 16, 18 should be opened or closed, is the sole responsibility of the superordinate control system 14. Correspondingly, the compact control device 12 forms a linking element between the control system 14 and the actuators 16, 18 in some preferred embodiments.

In the exemplary embodiment illustrated, the control system 14 is a safety PLC which, for its part, enables failsafe signal processing within the meaning of category SIL 3 of the European Standard EN IEC 61508 and/or PL e in accordance with EN ISO 13849. Accordingly, control system 14 in this case generates a first control signal 36*a* and a redundant second control signal 38*a*, which together form a joint control signal, which is intended to effect release of the safety brake 16. Preferably, the two control signals 36*a*, 38*a* each are binary voltage signals based on a signal ground. In the exemplary embodiment illustrated, each control signal 36, 38 has a dedicated signal ground 36*b*, 38*b*, with the result that, in this case, four lines are required for transmitting the two redundant control signals from the control system 14 to the compact control device 12. Alternatively, the compact control device 12 may receive a two-pole input signal at the inputs 40*a*-40*d* in this case. In other exemplary embodiments, the first and second control signals 36, 38 can use a common signal ground, with the result that two control lines and a common ground line are sufficient for the transmission of the redundant control signals. Furthermore, it is conceivable in further exemplary embodiments that the control system 14 transmits the first control signal 36 to the compact control device 12 only over one channel if a cross-circuit identification is not required or is implemented in another way. The latter can take place, for example, with by means of a dynamically coded signal which is transmitted from the control system 14 via a single-channel connecting line to the compact control device 12.

The compact control device 12 has four input connections for receiving the first and second control signals 36, 38, of which two input connections are denoted by 40*a*, 40*d*. The input connections 40*a*, 40*d*, in the preferred exemplary embodiments, are in the form of screw connections and/or plug-type connections on an outer side of the device housing 30 and are capable of fastening connecting lines from the control system 14 in a known manner.

The compact control device 12 is in this case capable of controlling two redundant actuators, i.e. in particular two redundant safety brakes 16, 18. Therefore, the compact control device 12 in this exemplary embodiment has four further input connections 42, to which a first and a redundant second control signal 44, 46 can be supplied by the control system 14, wherein the control signals 44, 46 in this case define the desired position of the second safety brake 18.

Furthermore, the compact control device 12 in this exemplary embodiment has two input connections 48, to which in each case one third control signal 50, 52 can be supplied. The third control signals 50 and 52 each are single-channel control signals which represent a desired position for the safety brakes 16 and 18, respectively, wherein the compact control device 12 is designed to disconnect the control current 32 rather slowly depending on the control signal 50/52, whereas the control current 32 is interrupted as quickly as possible depending on the first and second control signals 36, 38 and 44, 46, respectively. In the preferred exemplary embodiments, the compact control device 12 therefore has an anti-surge element with at least two anti-surge operating modes for each control current path, as is known from DE 103 25 363 A1 mentioned at the outset. This document and U.S. Pat. No. 7,573,693 with the same content are incorporated here by reference.

Overall, the control system 14 can therefore effect closing of the safety brakes 16, 18 very quickly in an emergency situation by instructing interruption of the control current 32 via the control signals 36/38 and 44/46. As an alternative to this, the control system 14 can instruct interruption of the control current 32 via the control signals 50, 52. In the present exemplary embodiment, redundant first and second control signals are used only for the quick emergency disconnection of the control current, whereas the (third) control signals for the slow closing of the brakes are single-channel binary signals.

The compact control device 12 furthermore has four output connections 54a, 54b and 56a, 56b, wherein the output connections 54a, 54b form a first two-pole output connection for connecting the safety brake 16, while the output connections 56a, 56b form a second two-pole output connection for connecting the safety brake 18. The control current 32 flows via the output connection 54a to brake 16 and via the output connection 54b back to the compact control device 12. The voltage required for generating the control current 32 is obtained by the compact control device 12 in this exemplary embodiment via two supply connections 58a, 58b. In the exemplary embodiment illustrated, the compact control device 12 is designed to receive a supply voltage of 24V and/or 48 volts at the supply connections 58a, 58b. As illustrated in FIG. 1, the second safety brake 18, in parallel with the first safety brake 16, is connected to the supply voltage at the supply connections 58a, 58b.

The compact control device 12 furthermore has three further output connections 60a, 60b, 60c, at which the evaluation unit 22 provides external status signals which signal the respective actual state of the brakes 16, 18 and/or a fault state of the compact control device 12. In the preferred exemplary embodiments, the output connections 60a, 60b, 60c are connected to corresponding inputs of the control system 14, which is not illustrated here for reasons of clarity.

Furthermore, the compact control device 12 in this case has two input connections 62, 64, which are used for receiving an external position signal, which represents the respective actual state of the actuators 16, 18. In the exemplary embodiment illustrated, the compact control device 12 has a further output connection 66, via which the evaluation unit 22 provides a test signal 68. In the exemplary embodiment illustrated, the test signal 68 is fed back to the input connection 62 via a first switch 70. Furthermore, the test signal 68 is fed back to the input connection 64 via a further switch 72. The switch position of the switches 70, 72 is dependent on whether the safety brakes 16, 18 are opened or closed, as is explained in more detail below with reference to FIGS. 2 and 3. In this case, the switch position of the switch 70 represents the operating state of the safety brake 16, while the switch 72 represents the operating state of the safety brake 18. The evaluation unit 22 can therefore detect the operating state of the respective safety brake by means of the test signal 68 and the switches 70, 72. The compact control device 12 signals the respectively identified operating state for the control system 14 with the aid of the status signals at the output connections 60a to 60c. In the preferred exemplary embodiment, the compact control device 12 signals, via the output connection 60a, whether there is fault-free operation or not. Correspondingly, the fault signal 34, which in the present case is a binary fault signal, is output via the output connection 60a. A high signal signals a fault-free operation, while a low signal indicates a fault. It goes without saying that the significance of the signal levels can also be reversed, wherein the assignment selected here is preferred since only an active high level signals a fault-free operation.

The compact control device 12 signals the operating state of the safety brake 16 via the output connection 60b. The compact control device 12 signals the operating state of the safety brake 18 via the output connection 60c.

Finally, the compact control device 12 also has two further output connections 74a, 74b. At these output connections, the evaluation unit 22 generates two clock signals (not illustrated here) which are phase-shifted relative to one another and which can advantageously be used when the compact control device 12 is not intended to be connected to a control system 14 which provides potential-based control signals at the input terminals 40, 42 and 48. For example, there are also control systems which provide outputs with potential-free relay contacts whose state needs to be monitored by a downstream device with the aid of test signals. The clock signals at the output terminals 74a, 74b are designed to monitor such outputs of an upstream control system by virtue of the phase-shifted clock signals being fed back to the input connections 40, 42 and 48 via the respective output relays of the control system. Accordingly, evaluation unit 22 is capable of optionally processing potential-based control signals at the inputs 40, 42, 48 or comparing clock signals present at the inputs 40, 42, 48 with the clock signals provided at the output connections 74a, 74b and of actuating the power switching elements 24a to 24d depending thereon.

Figure 2:
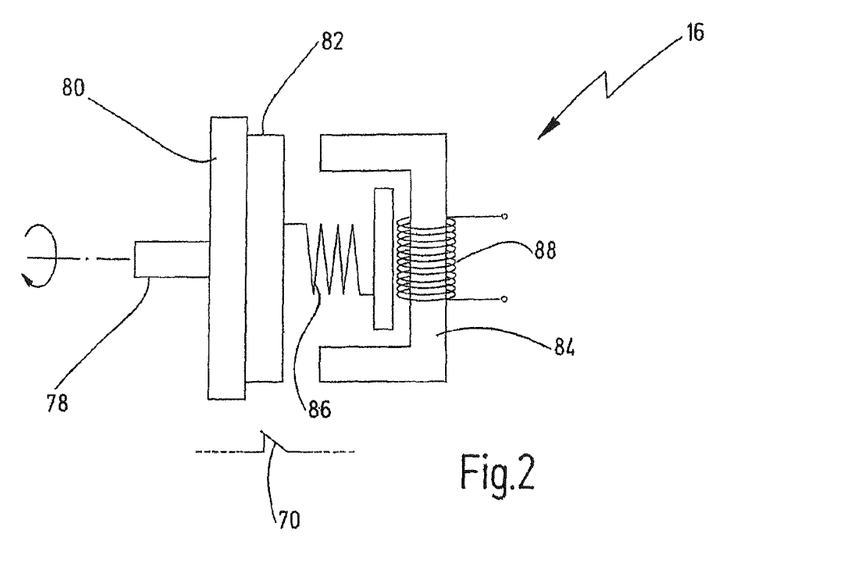
FIG. 2 shows a simplified illustration of a safety brake which is actuated by the novel compact control device, in a first operating position.

The operation of the safety brakes 16, 18 will be described below with reference to FIGS. 2 and 3. Each of the two brakes is designed to prevent a shaft 78 from performing a rotary movement about the respective shaft axis. For this purpose, each brake has a rotor 80, which is connected, in rotationally fixed fashion, to the shaft 78, and an armature plate 82. An electromagnet is denoted by reference number 84. A spring is denoted by reference numeral 86. The spring 86 biases the armature plate 82 in this case in such a way that the armature plate 82 presses against the rotor 80 via a friction lining (not illustrated here) and prevents a rotary movement of the shaft 78. The armature plate 82 can be drawn away from the rotor 80 by means of the electromagnet 84 counter to the force of the spring 86 in order to enable a rotation of the shaft 78. In order to enable (release) the safety brake, therefore, a control current 32 needs to flow through the field coil 88, whose magnetic field is sufficient to move the armature plate 82 counter to the force of the spring 86.

In the present exemplary embodiment, the released position of the armature plate 82 (FIG. 3) is a defined end position within the meaning of the invention. Reaching of the defined end position is in this case detected by means of the switches 70 and 72. In the exemplary embodiment illustrated, switch 70 is open when the armature plate 82 is located in the end position. In this case, the test signal 68 no longer passes from the output connection 66 of the compact control device 12 to the input connection 62, which is detected by the evaluation unit 22. In accordance with one exemplary embodiment, the evaluation unit 22 monitors, by means of the test signal 68 read back via the switch 70, 72, whether the armature plates 82 of the brakes 16, 18 actually reach the end position within a defined time span T1 after switch-on of the control current 32. If this is not the case, the compact control device 12 signals this fault state by means of the fault signal 34 at the output connection 60a.

Figure 4:
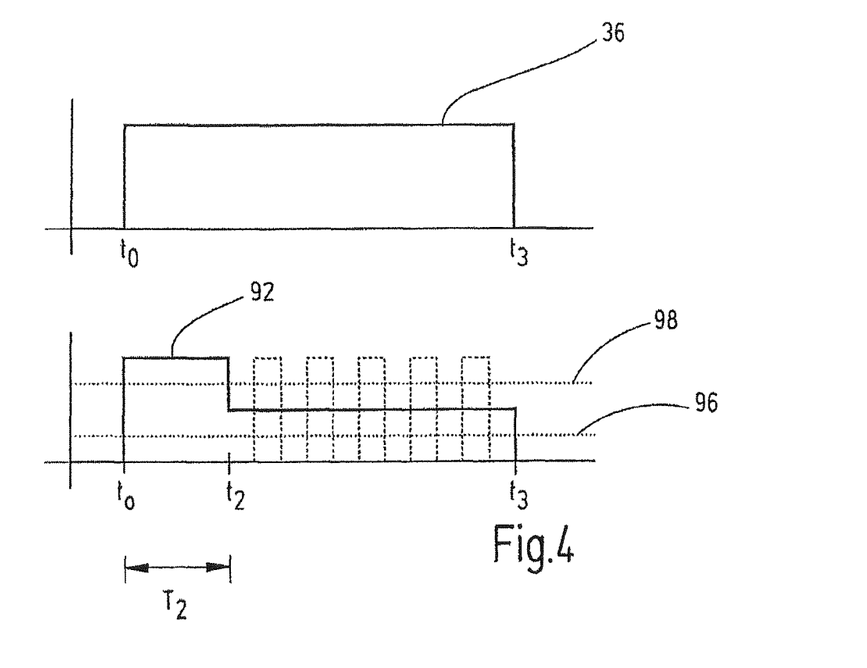
FIG. 4 shows two control signals at the input and output of the compact control device from FIG. 1.
Figure 5:
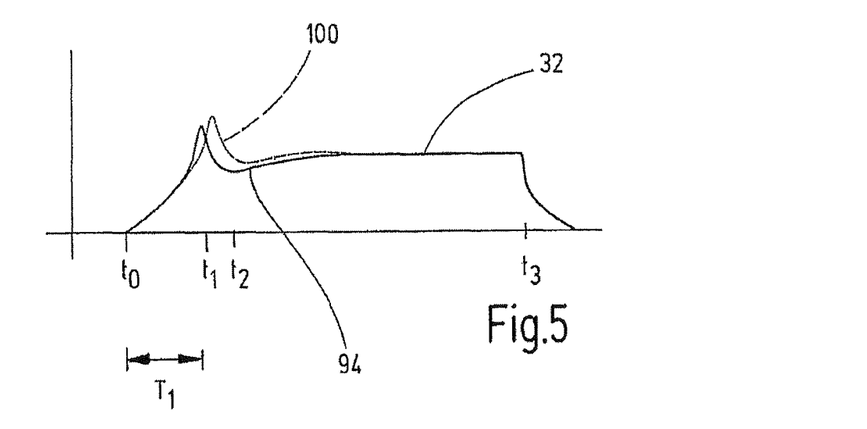
FIG. 5 shows a characteristic current profile of the control current during switch-on and switch-off in a simplified illustration.

The operation of the compact control device 12 will now be explained in further detail with reference to FIGS. 4 and 5. In the graph at the top, FIG. 4 shows the profile of the first control signal 36, with which the control system 14 defines the desired position of the safety brake 16. The control signal 36 changes from a low level to a high level at time $t_0$ and remains at the high level up to time $t_3$. Correspondingly, the safety brake 16 is intended to be open (released) in the time span between $t_0$ and $t_3$.

The graph at the bottom in FIG. 4 illustrates the profile of a control voltage 92 which is generated by the evaluation unit 12 by means of the supply voltage at the connections 58a, 58b and by means of the power switching elements 24a, 24b. At time $t_0$, the evaluation unit 22 closes the power switching elements 24a, 24b. Thus, the supply voltage of, for example, 48 V passes from the supply connections 58a, 58b to the full extent to the field coil 88 of the electromagnet 84. A control current 32 is produced which, owing to the mutual induction of the field coil 88, initially increases slowly and then largely exponentially. The corresponding current profile 94 is illustrated in simplified form in FIG. 5. At time $t_1$, the magnetic field generated by the control current 32 is sufficient to move armature plate 82 counter to the force of the spring 86. This results in a dip in the control current 32.

Since a lower control current 32 is sufficient for holding the armature plate 82 than for initially attracting the armature plate 82, the evaluation unit 22 decreases the control voltage 92 in this case at time $t_2$ to a lower holding voltage. In preferred exemplary embodiments, the evaluation unit 22 actuates the power switching elements 24 in a pulsed manner for this purpose, which is illustrated by dashed lines in FIG. 4. The resultant control voltage has an average value which is reduced in comparison with the initial control voltage. As a result, a largely stationary quiescent current through the field coil 88 is set. These conditions remain largely stationary until the evaluation unit 22 interrupts the control voltage 92 at time $t_3$. As a result, the control current 32 decreases exponentially, which is illustrated in simplified form in FIG. 5. As soon as the control current 32 has decreased to such an extent that the magnetic field of the electromagnet 84 can no longer hold the armature plate 82, the spring 86 presses the armature plate 82 against the rotor 80 again. The safety brake is closed.

In preferred exemplary embodiments, the evaluation unit 22 monitors the control voltage 92 in respect of a lower limit 96 and in respect of an upper limit 98. In other words, the evaluation unit 22 monitors whether the control voltage 92 assumes, during continuous operation, an average value which is between the defined lower limit 96 and the defined upper limit 98. If the control voltage 92 is too low, there is the risk of the electromagnet 84 not being able to hold the armature plate 82 in the released state. This can result in undesired closing of the brake. If the control voltage 92 is too high, on the other hand, this has a disadvantageous effect on the disconnection speed of the control current 32. In the preferred exemplary embodiments, the evaluation unit 22 signals, by means of fault signal 34, when the control voltage 92 is outside the range which is defined by the lower limit 96 and the upper limit 98.

Figure 3:
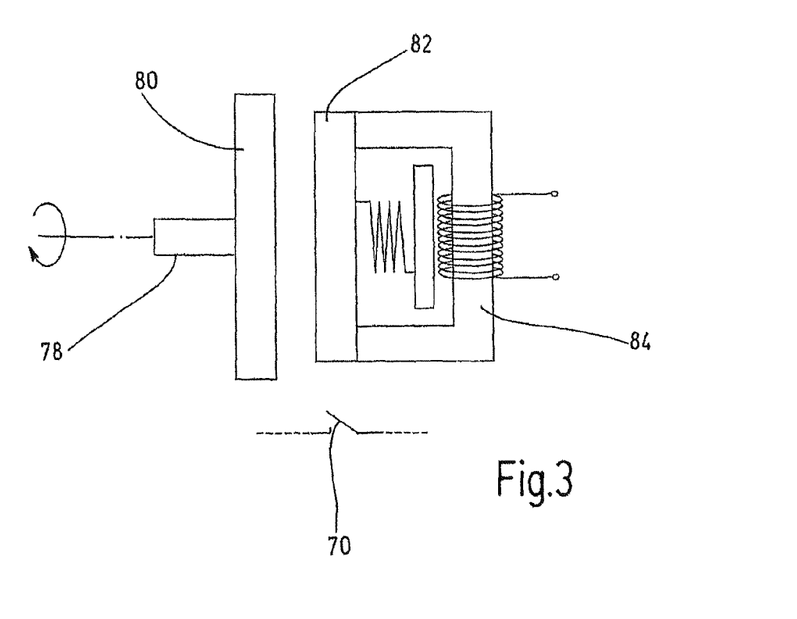
FIG. 3 shows the safety brake from FIG. 2 in a second operating position.

Furthermore, the evaluation unit 22 in the preferred exemplary embodiments monitors the time interval $T_1$ between switch-on of the control voltage 92 and the time $t_1$ at which the armature plate 82 has reached the defined end position, as shown in FIG. 3. If this time interval is too long, the evaluation unit 22 signals this likewise with by means of the fault signal 34.

Furthermore, the evaluation unit 22 in the preferred exemplary embodiments monitors the signals at the input and output connections for any cross-circuits, ground faults or interruptions. Any fault is also signaled in this case by means of fault signal 34.

In accordance with a further exemplary embodiment, the evaluation unit 22 can detect reaching of the end position by the armature plate 82 on the basis of the current profile 94. In this exemplary embodiment, the evaluation unit 22 has a memory (not illustrated here), in which a defined reference profile 100 in the form of table values or in the form of parameters of a reference function is stored. The evaluation unit 22 measures the present profile 94 of the control current 32 and compares this with the reference profile 100. In this case it is sufficient if the comparison of the present current profile 94 and the reference profile 100 is performed in relation to characteristic properties, for example the dip in the current profile after release of the armature plate 82.

In further exemplary embodiments, it is possible to use a contactless proximity switch instead of a mechanical switch 70, 72, which contactless proximity switch can be used to detect when the armature plate 82 reaches the defined end position. Furthermore, in further exemplary embodiments, it is possible to combine the monitoring of the current profile 94 with the use of a contact-based and/or contactless switch.

What is claimed is:

1. A compact control device for failsafely controlling an electrical actuator, which is capable of moving a movable machine part into a defined end position, the compact control device comprising:
   a device housing,
   a first input connection arranged on the device housing for receiving a first external control signal which represents a desired position of the machine part,
   an input part arranged in the device housing for detecting a position signal which signals an actual position of the machine part at the defined end position,
   a power section arranged in the device housing and having at least one power switching element designed to switch on and failsafely switch off a control current for the actuator,
   a first output connection arranged on the device housing for supplying the control current to the electrical actuator,
   a second output connection arranged on the device housing for providing an external status signal,
   an evaluation unit arranged in the device housing and designed to actuate the at least one power switching element depending on the first external control signal and to generate the external status signal at the second output connection depending on the position signal, and
   a second input connection arranged on the device housing for receiving a second external control signal which represents the desired position of the machine part in a redundant manner with the first external control signal.

2. The compact control device of claim 1, further comprising a third input connection arranged on the device housing for receiving an external third control signal, which represents the desired position of the machine part independently of the first external control signal, wherein the evaluation unit disconnects the control current more slowly depending on the third control signal than depending on the first control signal.

3. The compact control device of claim 1, wherein the first external control signal is a binary control signal.

4. The compact control device of claim 1, wherein the input part has at least one further input connection, via which the position signal can be supplied to the evaluation unit as an external position signal.

5. The compact control device of claim 1, further comprising a third output connection, at which the evaluation unit provides a first test signal configured to be fed back to the input part as a binary position signal via an external position switch.

6. The compact control device of claim 1, wherein, during switch-on, the control current has a defined current profile which is dependent on the actuator, and wherein the input part compares the defined current profile with a defined reference profile in order to determine the position signal.

7. The compact control device of claim 1, wherein the evaluation unit generates a fault signal at the second output connection when the position signal does not signal an actual position of the machine part at the defined end position within a defined first time span after switch-on of the control current.

8. The compact control device of claim 1, wherein the at least one power switching element comprises a first power switching element and a second power switching element, which switch the control current redundantly with respect to one another.

9. The compact control device of claim 1, wherein the first output connection comprises a first positive output connection and a first negative output connection, which together form a redundant two-pole output for connection of the actuator.

10. The compact control device of claim 1, wherein the power section comprises a control voltage which causes the control current to the actuator, and wherein the evaluation unit decreases the control voltage after a defined second time span has elapsed following switch-on of the control current.

11. The compact control device of claim 1, wherein the power section comprises a control voltage which causes the control current to the actuator, wherein the evaluation unit monitors the control voltage in respect of a lower limit and in respect of an upper limit, and wherein the evaluation unit generates the external status signal depending on the monitored control voltage as well.

12. The compact control device of claim 1, wherein the at least one power switching element is designed to switch a control current of more than 2 A.

13. A compact control device for failsafely controlling an electrical actuator, which is capable of moving a movable machine part into a defined end position, the compact control device comprising:
   a device housing,
   a first input connection arranged on the device housing for receiving a first external control signal which represents a desired position of the machine part,
   an input part arranged in the device housing for detecting a position signal which signals an actual position of the machine part at the defined end position,
   a power section arranged in the device housing and having at least one power switching element designed to switch on and failsafely switch off a control current for the actuator,
   a first output connection arranged on the device housing for supplying the control current to the electrical actuator,
   a second output connection arranged on the device housing for providing an external status signal,
   an evaluation unit arranged in the device housing and designed to actuate the at least one power switching element depending on the first external control signal and to generate the external status signal at the second output connection depending on the position signal, and
   a further input connection arranged on the device housing for receiving a further external control signal, which represents the desired position of the machine part independently of the first external control signal, wherein the evaluation unit disconnects the control current more slowly depending on the further external control signal than depending on the first external control signal.

14. A compact control device for failsafely controlling an electrical actuator, which is capable of moving a movable machine part into a defined end position, the compact control device comprising:
   a device housing,
   a first input connection arranged on the device housing for receiving a first external control signal which represents a desired position of the machine part,
   an input part arranged in the device housing for detecting a position signal which signals an actual position of the machine part at the defined end position,
   a power section arranged in the device housing and having at least one power switching element designed to switch on and failsafely switch off a control current for the actuator,
   a first output connection arranged on the device housing for supplying the control current to the electrical actuator,
   a second output connection arranged on the device housing for providing an external status signal, and
   an evaluation unit arranged in the device housing and designed to actuate the at least one power switching element depending on the first external control signal and to generate the external status signal at the second output connection depending on the position signal,
   wherein, during switch-on, the control current has a defined current profile which is dependent on the actuator, and wherein the input part compares the defined current profile with a defined reference profile in order to determine the position signal.

* * * * *